US012614764B2

(12) United States Patent
Kim

(10) Patent No.: US 12,614,764 B2
(45) Date of Patent: Apr. 28, 2026

(54) BATTERY MODULE AND BATTERY PACK INCLUDING THE SAME

(71) Applicant: LG ENERGY SOLUTION, LTD.,
Seoul (KR)

(72) Inventor: Bong Gun Kim, Daejeon (KR)

(73) Assignee: LG ENERGY SOLUTION, LTD.,
Seoul (KR)

( * ) Notice: Subject to any disclaimer, the term of this patent is extended or adjusted under 35 U.S.C. 154(b) by 571 days.

(21) Appl. No.: 18/022,715

(22) PCT Filed: Feb. 8, 2022

(86) PCT No.: PCT/KR2022/001878
§ 371 (c)(1),
(2) Date: Feb. 22, 2023

(87) PCT Pub. No.: WO2022/173182
PCT Pub. Date: Aug. 18, 2022

(65) Prior Publication Data
US 2024/0039056 A1     Feb. 1, 2024

(30) Foreign Application Priority Data

Feb. 9, 2021     (KR) ......................... 10-2021-0018468

(51) Int. Cl.
*H01M 10/42*          (2006.01)
*H01M 10/653*         (2014.01)
(Continued)

(52) U.S. Cl.
CPC ..... *H01M 10/4235* (2013.01); *H01M 10/653* (2015.04); *H01M 10/658* (2015.04);
(Continued)

(58) Field of Classification Search
CPC .......... H01M 10/4235; H01M 10/653; H01M 10/658; H01M 50/204; H01M 50/242;
(Continued)

(56)                References Cited

U.S. PATENT DOCUMENTS

2013/0071718 A1     3/2013  Cho et al.
2014/0193685 A1     7/2014  Lim
                    (Continued)

FOREIGN PATENT DOCUMENTS

CN          106058363 A   * 10/2016   .......... H01M 10/625
CN          205646054 U   * 10/2016   ............ Y02E 60/10
                    (Continued)

OTHER PUBLICATIONS

International Search Report issued in PCT/KR2022/001878 (PCT/ISA/210), mailed on May 27, 2022.
(Continued)

*Primary Examiner* — Kaity V Chandler
(74) *Attorney, Agent, or Firm* — Birch, Stewart, Kolasch & Birch, LLP

(57)                ABSTRACT
A battery module includes a battery cell stack formed by stacking a plurality of battery cells; a module frame that houses the battery cell stack; and a compression pad disposed between the battery cells, wherein the compression pad has a porous structure.

9 Claims, 7 Drawing Sheets

(51) Int. Cl.

| | |
|---|---|
| *H01M 10/658* | (2014.01) |
| *H01M 50/204* | (2021.01) |
| *H01M 50/242* | (2021.01) |
| *H01M 50/291* | (2021.01) |
| *H01M 50/383* | (2021.01) |

(52) U.S. Cl.
CPC ....... *H01M 50/204* (2021.01); *H01M 50/242* (2021.01); *H01M 50/291* (2021.01); *H01M 50/383* (2021.01)

(58) Field of Classification Search
CPC ............. H01M 50/291; H01M 50/383; H01M 2220/20; H01M 10/613; H01M 10/647; H01M 50/209; H01M 50/211; H01M 50/233; H01M 50/24; H01M 50/293; Y02E 60/10
See application file for complete search history.

(56) References Cited

U.S. PATENT DOCUMENTS

| | | | |
|---|---|---|---|
| 2019/0140237 A1 | 5/2019 | Kaye et al. | |
| 2019/0148696 A1 | 5/2019 | Kaye et al. | |
| 2019/0267591 A1 | 8/2019 | Park et al. | |
| 2020/0287252 A1 | 9/2020 | Li et al. | |
| 2020/0295415 A1 | 9/2020 | Honda et al. | |
| 2022/0037714 A1 | 2/2022 | Lee | |
| 2022/0255182 A1 | 8/2022 | Kogami et al. | |

FOREIGN PATENT DOCUMENTS

| | | | | | |
|---|---|---|---|---|---|
| CN | 206116493 U | | 4/2017 | | |
| CN | 106848343 A | * | 6/2017 | ........ | H01M 10/6571 |
| CN | 106252787 B | * | 3/2019 | .......... | H01M 10/613 |
| CN | 109643778 A | * | 4/2019 | .......... | H01M 10/658 |
| CN | 109786588 A | * | 5/2019 | ............. | Y02E 60/10 |
| CN | 112072022 A | | 12/2020 | | |
| CN | 212257629 U | | 12/2020 | | |
| CN | 113108622 A | * | 7/2021 | ........ | H01M 10/6563 |
| CN | 113629331 A | * | 11/2021 | .......... | H01M 50/204 |
| CN | 113678308 A | * | 11/2021 | .......... | H01M 50/548 |
| DE | 10 2009 052 508 A1 | | 5/2011 | | |
| EP | 3 550 662 A1 | | 10/2019 | | |
| EP | 3 719 920 A1 | | 10/2020 | | |
| EP | 3 951 906 A1 | | 2/2022 | | |
| JP | 2009-301969 A | | 12/2009 | | |
| JP | 2012-160260 A | | 8/2012 | | |
| JP | 2013-131428 A | | 7/2013 | | |
| JP | 2015-162285 A | | 9/2015 | | |
| JP | 2016-115626 A | | 6/2016 | | |
| JP | 2018116813 A | * | 7/2018 | ............. | Y02E 60/10 |
| JP | 2019-21384 A | | 2/2019 | | |
| JP | 2019-67583 A | | 4/2019 | | |
| JP | 2019-83150 A | | 5/2019 | | |
| JP | 2020-501320 A | | 1/2020 | | |
| KR | 10-2013-0031147 A | | 3/2013 | | |
| KR | 10-1272524 B1 | | 6/2013 | | |
| KR | 20160058684 A | * | 5/2016 | ........ | H01M 10/6557 |
| KR | 10-1711692 B1 | | 3/2017 | | |
| KR | 10-1730961 B1 | | 4/2017 | | |
| KR | 10-2017-0135476 A | | 12/2017 | | |
| KR | 20170135476 A | * | 12/2017 | ........ | H01M 10/6569 |
| KR | 10-1885578 B1 | | 8/2018 | | |
| KR | 10-2083748 B1 | | 3/2020 | | |
| KR | 10-2020-0106378 A | | 9/2020 | | |
| KR | 102308635 B1 | * | 10/2021 | .......... | H01M 50/293 |
| WO | WO-2020045160 A1 | * | 3/2020 | ............. | H01M 50/24 |
| WO | WO 2020/203684 A1 | | 10/2020 | | |
| WO | WO 2020/262081 A1 | | 12/2020 | | |

OTHER PUBLICATIONS

Extended European Search Report for European Application No. 22752942.7, dated Jun. 25, 2024.

* cited by examiner

【FIG. 1】
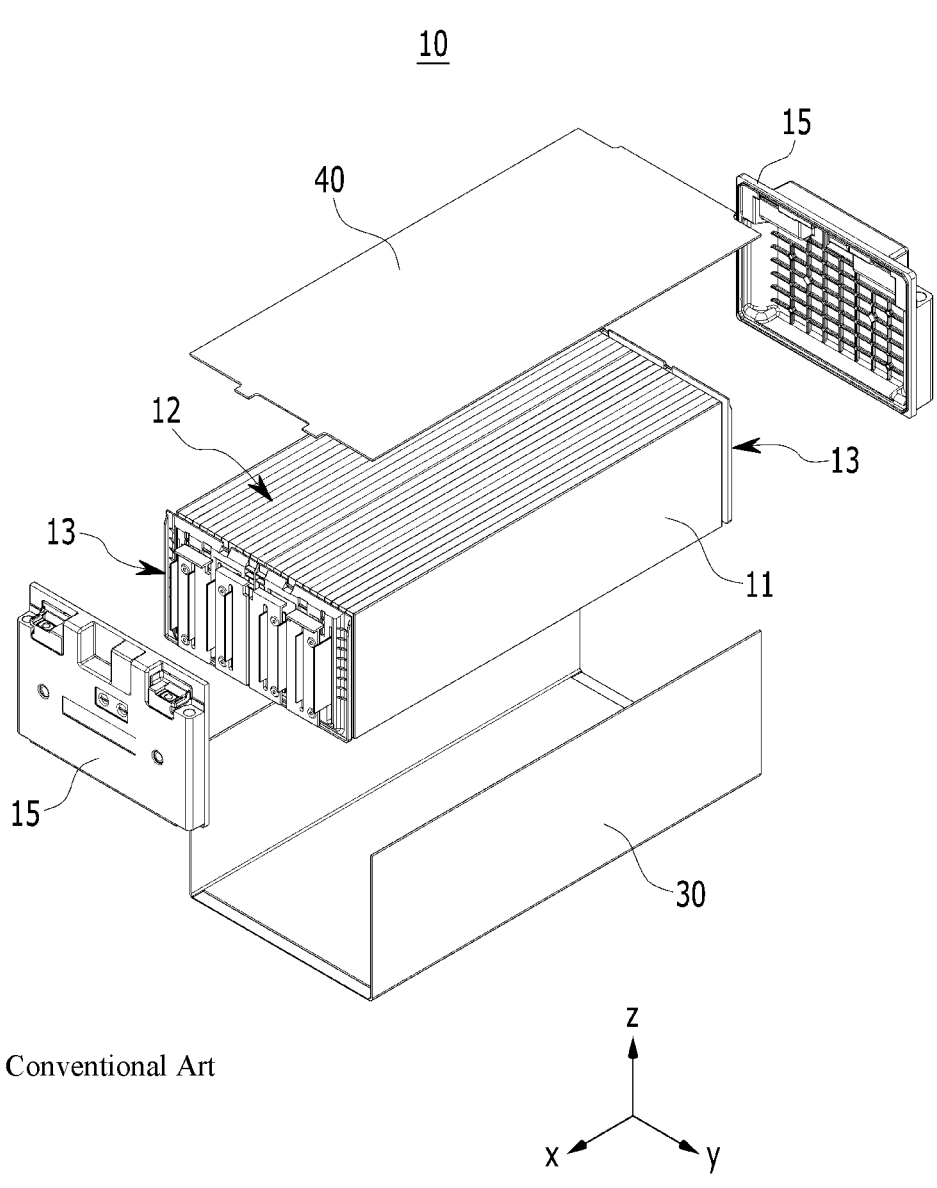
Conventional Art

【FIG. 2】
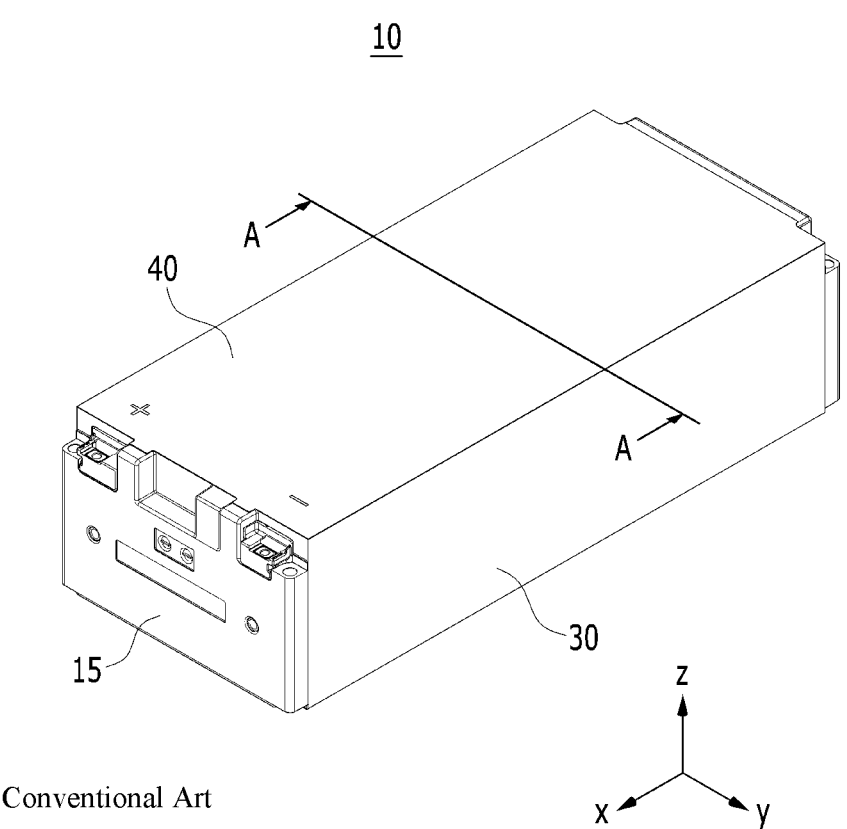
Conventional Art

【FIG. 3】
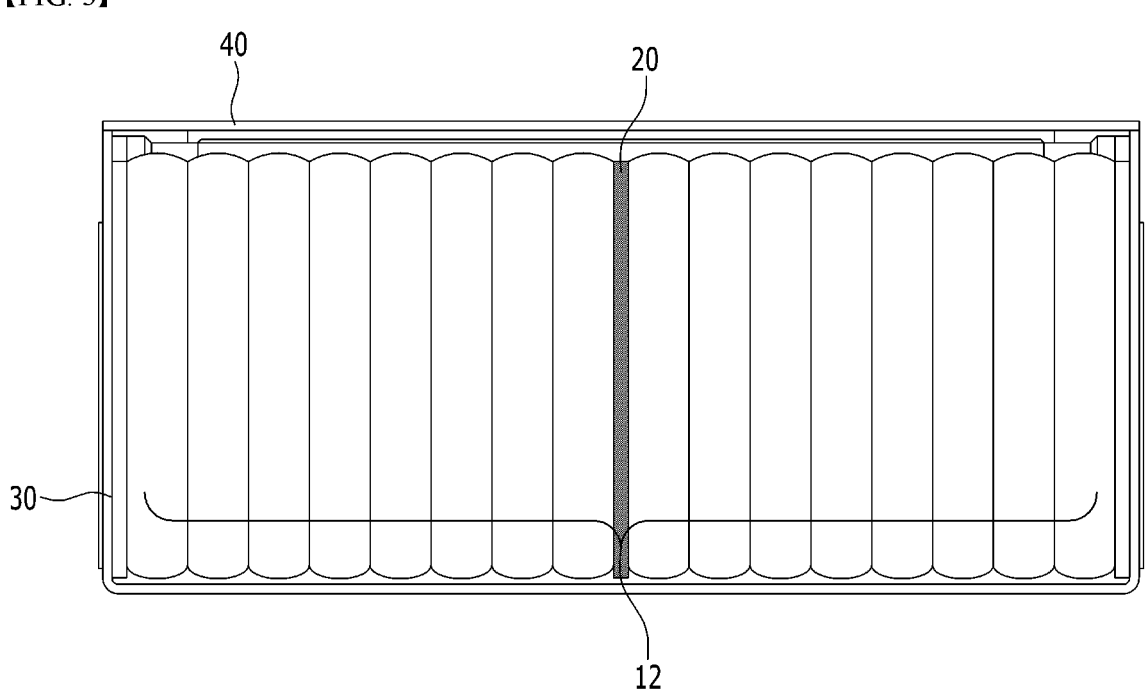
Conventional Art

【FIG. 4】
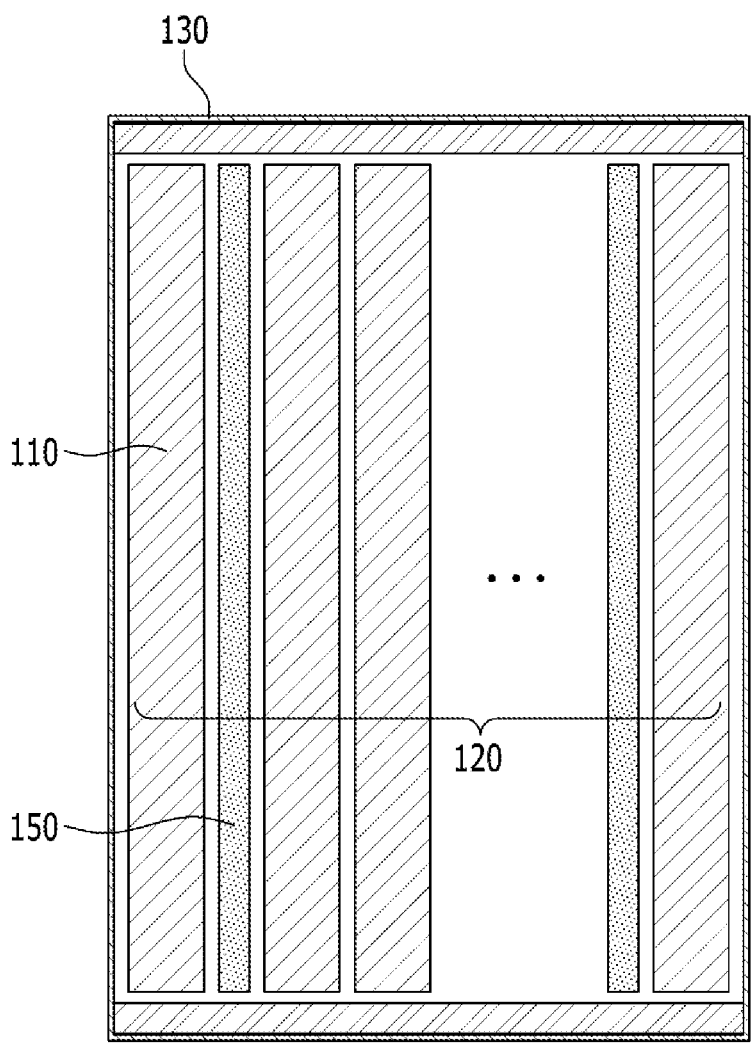

【FIG. 5】
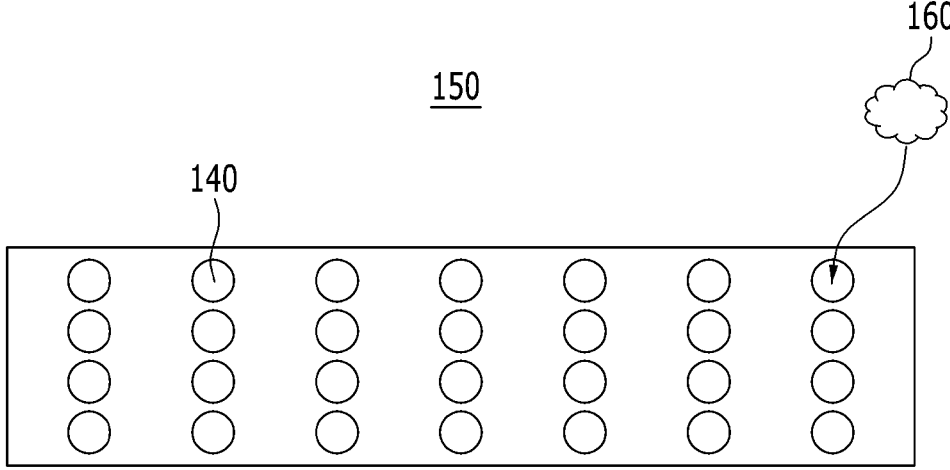
【FIG. 6】
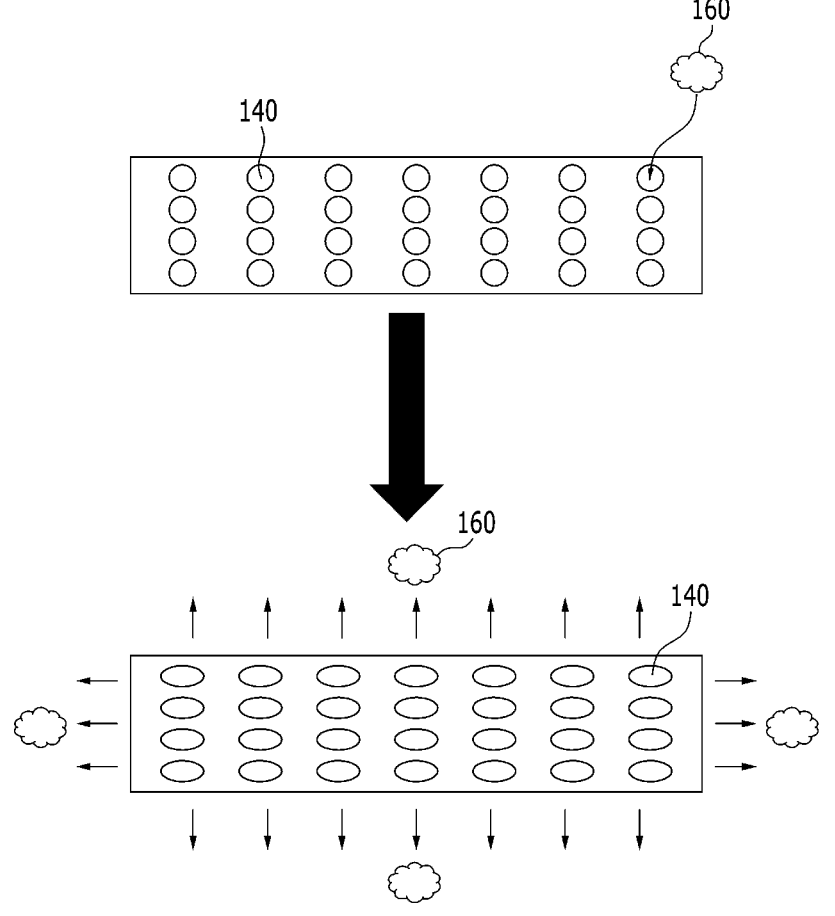

【FIG. 7】
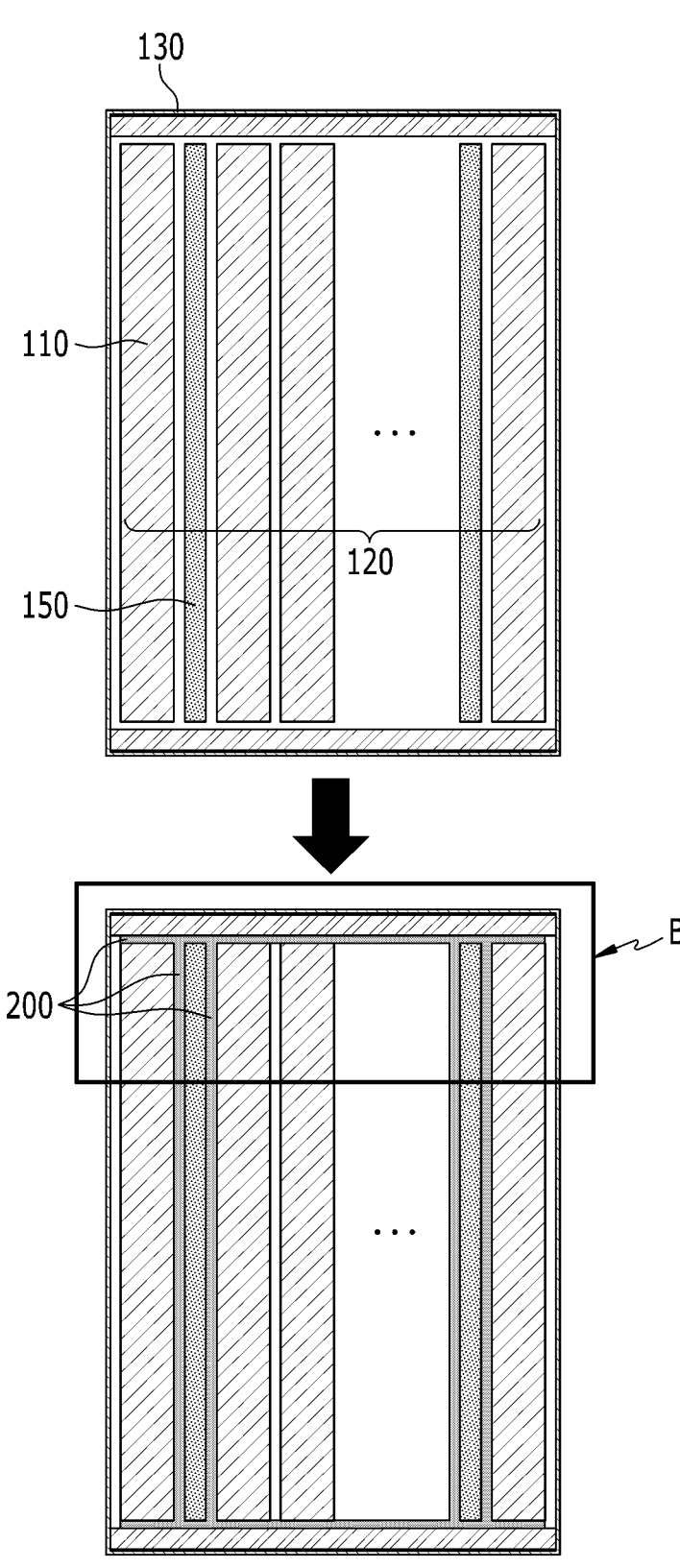

【FIG. 8】
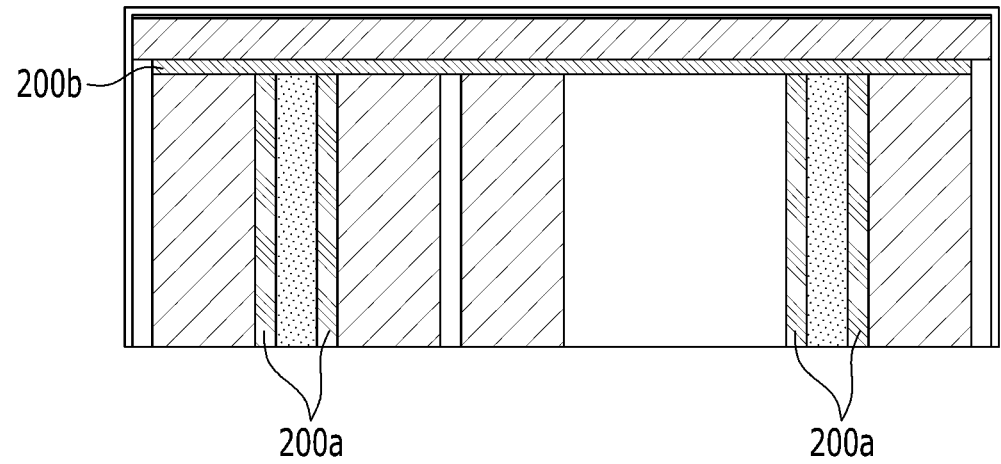
200b
200a          200a
【FIG. 9】
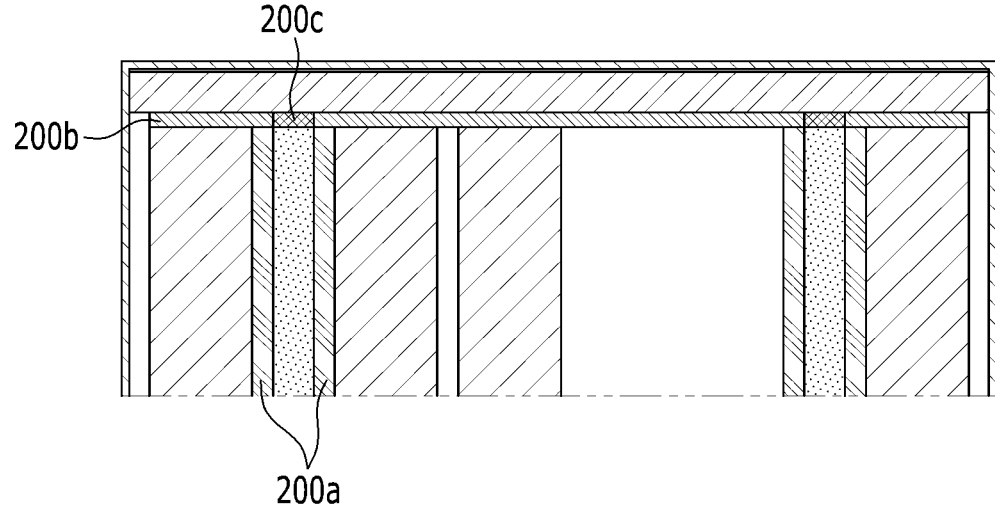
200c
200b
200a

BATTERY MODULE AND BATTERY PACK INCLUDING THE SAME

CROSS CITATION WITH RELATED APPLICATION(S)

This application claims the benefit of Korean Patent Application No. 10-2021-0018468 filed on Feb. 9, 2021 with the Korean Intellectual Property Office, the content of which is incorporated herein by reference in its entirety.

TECHNICAL FIELD

The present disclosure relates to a battery module and a battery pack including the same, and more particularly, to a battery module with enhanced safety and a battery pack including the same.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

FIG. 1 is an exploded perspective view of a conventional battery module. FIG. 2 is a perspective view showing a state in which components constituting the battery module of FIG. 1 are combined. FIG. 3 is a cross-sectional view taken along the cutting line A-A of FIG. 2.

Referring to FIGS. 1 to 3, a conventional battery module 10 includes a battery cell stack 12 in which a plurality of battery cells 11 are stacked in one direction, a module frame 30 that houses the battery cell stack 12, end plates 15 that cover the front and rear surfaces of the battery cell stack 12, and a busbar frame 13 formed between the end plate 15 and the front and rear surfaces of the battery cell stack 12. The module frame 30 includes a lower frame 30 that covers the lower and both side surfaces of the battery cell stack 12, and an upper plate 40 that covers the upper surface of the battery cell stack 12.

Further, as shown in FIG. 3, a compression pad 20 is positioned between a pair of battery cells adjacent to each other in the battery cell stack 12.

Referring to FIGS. 2 and 3, the compression pad 20 included in the conventional battery module 10 may be in contact with one surface of the battery cell 11. When the battery cell 11 is swollen, the battery cell stack 12 may apply stress to the module frame 30 and the upper plate 40, which may reduce the module rigidity. The compression pad 20 can absorb the swelling phenomenon. However, the compression pad 20 alone has little effect of reducing the heat propagation time when ignition occurs within the module, which makes it difficult to prevent ignition. In particular, when the battery cell 11 ignites, the secondary cell ignites due to the external heat conduction due to the flame generated in the battery cell 11 as well as heat conduction between adjacent battery cells 11, and the risk may be very high.

Therefore, unlike the conventional case, there is a need to develop a battery module that not only absorbs the swelling phenomenon, but also prevents ignition within the module and effectively delays the heat propagation speed between battery cells.

DETAILED DESCRIPTION OF THE INVENTION

Technical Problem

It is an object of the present disclosure to provide a battery module that prevents ignition within the module and effectively delays the heat propagation speed between battery cells, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a battery cell stack formed by stacking a plurality of battery cells; a module frame that houses the battery cell stack; and a compression pad disposed between the plurality of battery cells, wherein the compression pad has a porous structure.

The porous structure includes a plurality of holes, and a plurality of protective substrates may be respectively formed in the plurality of holes.

Each protective inserts of the plurality of protective inserts may include at least one of a heat absorbing member and a heat insulating member.

A material forming each protective inserts of the plurality of protective inserts may flow to the outside of the hole by swelling of a battery cell of the plurality of battery cells to form a barrier film.

The barrier film may include a first barrier film formed between the battery cell and the compression pad.

The barrier film may further include a second barrier film formed between the battery cell stack and an upper plate of the module frame.

Each hole of the plurality of holes may have an elliptical shape.

The elliptical shape may be formed long in a direction in which an electrode lead of the battery cell protrudes.

The heat absorbing member or the heat insulating member may include a fire extinguishing agent containing at least one of sodium hydrogen carbonate, potassium hydrogen carbonate, and monoammonium phosphate.

The compression pad may be formed of at least one of urethane, polyurethane, low-density polyether, and polyester.

According to one embodiment of the present disclosure, there is provided a battery pack comprising the above-mentioned battery module.

Advantageous Effects

According to embodiments of the present disclosure, a compression pad having a porous structure interposed between a pair of battery cells adjacent to each other can be formed, and a protective inserts may be formed inside the porous structure of the compression pad. At this time, the pressure applied to the battery cell when the battery cell ignites causes the protective inserts to be released to the outside from the inside of the porous structure to form a barrier film. Therefore, the heat propagation speed between adjacent battery cells can be delayed.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery module;

FIG. 2 is a perspective view showing a state in which components constituting the battery module of FIG. 1 are combined;

FIG. 3 is a cross-sectional view taken along the cutting line A-A of FIG. 2;

FIG. 4 is a plan view of a battery module according to an embodiment of the present disclosure;

FIG. 5 is a plan view showing a compression pad included in the battery module of FIG. 4;

FIG. 6 is a diagram showing a state before and after the compression pad of FIG. 5 receives external pressure;

FIG. 7 is a diagram showing that the compression pad according to the present embodiment receives the external pressure of FIG. 6 to form a barrier film;

FIG. 8 is an enlarged view showing a section B of FIG. 7; and

FIG. 9 is an enlarged view showing a section B of FIG. 7.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present.

In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

The compression pad 20 described with reference to FIGS. 1 to 3 is a comparative example, and may have a uniform cross-section and a constant thickness. The compression pad 20 may serve to prevent cell swelling, and may delay heat propagation to some extent when the cell ignites. On the other hand, the compression pad according to an embodiment of the present disclosure will be described later in detail.

FIG. 4 is a plan view of a battery module according to an embodiment of the present disclosure, which shows the state of a battery module according to an embodiment of the present disclosure as viewed from above. FIG. 5 is a plan view showing a compression pad included in the battery module of FIG. 4.

Referring to FIGS. 4 and 5, the battery module according to the present embodiment includes a battery cell stack 120 formed by stacking a plurality of battery cells 110, a module frame 130 that houses the battery cell stack 120, and a compression pad 150 disposed between the battery cells 110 adjacent to each other in the plurality of battery cells 110. At this time, the battery module according to the present embodiment shown in FIG. 4 may show the state of the battery module of FIG. 2 as viewed from above. Therefore, the direction from the upper part to the lower part of FIG. 4 may be the x-axis direction of FIG. 2. Although not shown in FIG. 4, the battery module according to the present embodiment may further include an upper plate (not shown) that covers the battery module of FIG. 4.

The compression pad 150 has a porous structure, and the porous structure according to the present embodiment includes a plurality of holes 140. The protective inserts 160 may be formed inside the plurality of holes 140.

The protective inserts 160 according to the present embodiment may include at least one of a heat absorbing member and a heat insulating member. At this time, the compression pad 150 is not only formed between the battery cells 110 positioned inside the battery cell stack 120, but also positioned between the outermost battery cell included in the battery cell stack 120 and the battery cell adjacent to the outermost battery cell. The compression pad 150 can be formed between the outermost battery cell adjacent to the module frame 130 and the battery cell adjacent to the outermost battery cell, and between the battery cells 110 positioned inside the battery cell stack 120, thereby blocking the flame generated in the battery cell 110 from propagating to the adjacent battery cell 110 or from transmitting the flame to the outside of the module. In addition, it can also delay heat propagation within the module. Specifically, according to the present embodiment, when swelling of the battery cell 110 occurs, the protective inserts 160 positioned inside the hole 140 receives pressure, the compression pad 150 is crushed, and the material forming the protective inserts 160 may flow and come out to the outside of the hole 140. When the material forming the protective inserts 160 comes out, a barrier film 200 may be formed between the battery cell 110 and the compression pad 150.

At this time, when swelling of the battery cell 110 occurs, the protective inserts 160 positioned inside the hole 140 receives pressure, and the compression pad 150 is crushed, so that the hole 140 may have an elliptical shape. Due to the elliptical shape, the protective inserts 160 can easily come out to the outside of the hole 140. The elliptical shape may be an elliptical shape formed long in a direction in which the electrode lead (not shown) of the battery cell protrudes. Further, the hole 140 may have an elliptical shape in various directions depending on the direction of the external pressure applied to the hole 140 by the swelling of the battery cell 110, but is not limited thereto.

Further, the compression pad 150 having a porous structure may be selected from materials having an intrinsically porous structure, such as urethane, polyurethane, low-density polyether, and polyester. Further, the porous structure may be formed by scanning a laser when the compression pad 150 is formed, or the hole 140 may be formed together when the compression pad 150 is formed, but is not limited thereto.

The compression pad 150 selected from the above material or the compression pad 150 formed through the above method includes a plurality of holes 140, and the protective inserts 160 can be interposed inside the hole 140. Further, at least one hole 140 can be formed on the compression pad 150, and as the number of holes 140 increases, the number of protective inserts 160 that can be interposed may increase. However, it is preferable that the hole 140 on the compression pad 150 is formed at a level capable of maintaining the function of the compression pad 150 for absorbing cell swelling, but is not limited thereto.

FIG. 6 is a diagram showing a state before and after the compression pad of FIG. 5 receives external pressure. FIG. 7 is a diagram showing that the compression pad according to the present embodiment receives the external pressure of FIG. 6 to form a barrier film. FIG. 8 is an enlarged view showing a section B of FIG. 7. FIG. 9 is an enlarged view showing a section B of FIG. 7.

Referring FIGS. 6 to 9, the protective inserts 160 interposed in the hole 140 of the compression pad 150 flows out from the hole 140 of the compression pad 150 as an external pressure is applied, so that a barrier film 200 can be formed. This is because the shape of the hole 140 of the compression pad 150 changes due to the external pressure as described above. The protective inserts 160 interposed inside the hole 140 is pushed out from the compression pad 150 to form a barrier film 200.

At this time, the barrier film 200 may include a first barrier film 200a formed between the battery cell 110 and the compression pad 150, and a second barrier film 200b formed between the battery cell stack 120 and the module frame 130, particularly, between the battery cell stack 120 and the upper plate (not shown) of the module frame 130. At this time, the second barrier layer may further include a third barrier layer 200c formed between the compression pad 150 and the module frame 130, particularly, the upper plate of the module frame 130.

The first barrier film 200a can cover a part or the whole of the space between the battery cell 110 and the compression pad 150, and the second barrier film 200b can cover a part or the whole of the space between the battery cell stack 120 and the module frame 130, particularly, the space between the battery cell stack 120 and the upper plates of the module frame 130. Particularly, between the compression pad 150 and the module frame 130 of the second barrier layer 200b, more particularly, between the upper plates of the module frame 130, the third barrier layer 200c can cover a part or the whole of the space between the compression pad 150 and the module frame 130, particularly, the space between the compression pad 150 and the upper plate of the module frame 130. Therefore, the degree of formation of the barrier film can be adjusted by adjusting the degree to which the protective inserts 160 flows out from the hole 140 according to the applied pressure.

Further, the first barrier film 200a, the second barrier film 200b, and the third barrier film 200c cover a part or the whole of the space to prevent ignition due to a temperature increase in the module. Additionally, it is possible to block the flame generated in the battery cell 110 from propagating to the adjacent battery cells 110 or from transmitting the flame to the outside of the module. In particular, the protective inserts 160 flows out of the hole 140 of the compression pad 150 and forms a barrier film 200 between the compression pad 150 and the battery cell 110 adjacent thereto. The barrier film 200 can also be formed in the space between the module frame 130 and the battery cell stack 120 or the module frame 130 and the compression pad 150, thereby delaying the overall speed of heat propagation in the module.

Further, although the present disclosure has been restrictively described only for the section B in FIGS. 7 to 9, the lower part of FIGS. 7 to 9 corresponding to the section B can also be described in the same manner as above.

The protective inserts 160 forming the barrier film 200 may include a heat absorbing member or a heat insulating member. The heat absorbing member or the heat insulating member may be a fire extinguishing agent, and more specifically, the fire extinguishing agent may be a liquid fire extinguishing agent or a powder fire extinguishing agent. The fire extinguishing agent may include at least one of sodium hydrogen carbonate, potassium hydrogen carbonate, and monoammonium phosphate, but is not limited thereto.

Meanwhile, one or more battery modules according to an embodiment of the present disclosure can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and the battery pack including the same, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

110: battery cell
120: battery cell stack
130: module frame
140: hole
150: compression pad
160: protective inserts

200: barrier film
200*a*: first barrier film
200*b*: second barrier film
200*c*: third barrier film

The invention claimed is:

1. A battery module comprising:
a battery cell stack formed by stacking a plurality of battery cells;
a module frame that houses the battery cell stack; and
a compression pad disposed between the plurality of battery cells,
wherein the compression pad has a porous structure,
wherein the porous structure comprises a plurality of holes, wherein a plurality of protective inserts is respectively located in the plurality of holes, and
wherein each protective insert of the plurality of protective inserts is configured to flow to the outside of the hole by swelling of at least one battery cell of the plurality of battery cells, the plurality of protective inserts configured to combine to form a barrier film.

2. The battery module of claim 1, wherein:
each of the plurality of protective inserts comprises at least one of a heat absorbing member and a heat insulating member.

3. The battery module of claim 1, wherein:
the barrier film comprises a first barrier film formed between the battery cell and the compression pad.

4. The battery module of claim 3, wherein:
the barrier film further comprises a second barrier film formed between the battery cell stack and an upper plate of the module frame.

5. The battery module of claim 4, wherein:
each hole of the plurality of holes is configured to deform to an elliptical shape due to the swelling of the battery cell.

6. The battery module of claim 5, wherein:
the elliptical shape is formed long in a direction in which an electrode lead of the battery cell protrudes.

7. The battery module of claim 2, wherein:
the heat absorbing member or the heat insulating member comprises a fire extinguishing agent containing at least one of sodium hydrogen carbonate, potassium hydrogen carbonate, and monoammonium phosphate.

8. The battery module of claim 1, wherein:
the compression pad is formed of at least one of urethane, polyurethane, low-density polyether, and polyester.

9. A battery pack comprising the battery module of claim 1.

* * * * *